United States Patent [19]
Aoki

[11] Patent Number: 5,659,426
[45] Date of Patent: Aug. 19, 1997

[54] ZOOM LENS

[75] Inventor: Masayuki Aoki, Oyama, Japan

[73] Assignee: Nikon Corporation, Tokyo, Japan

[21] Appl. No.: 609,563

[22] Filed: Mar. 1, 1996

[30] Foreign Application Priority Data

Mar. 31, 1995 [JP] Japan ................................. 7-100580

[51] Int. Cl.$^6$ .............................. G02B 15/14; G02B 3/02; G02B 13/18
[52] U.S. Cl. .......................... 359/683; 359/676; 359/708; 359/714
[58] Field of Search .................................... 359/683, 676, 359/708, 714

[56] References Cited

U.S. PATENT DOCUMENTS 4,033,674   7/1977   Sekiguchi ................................ 359/683

FOREIGN PATENT DOCUMENTS

8-5913   1/1996   Japan .

*Primary Examiner*—Georgia Y. Epps
*Assistant Examiner*—John P. Cornely
*Attorney, Agent, or Firm*—Shapiro and Shapiro

[57] ABSTRACT

A zoom lens has a first lens unit which is fixed in position during zooming and has a positive refractive power, a second lens unit which is movable upon zooming and has a negative refractive power, a third lens unit which is fixed in position during zooming and has a positive refractive power, a fourth lens unit which is movable upon zooming and has a negative refractive power, and a fifth lens unit which is fixed in position during zooming and has a positive refractive power. Upon zooming from the wide-angle end to the telephoto end, the second lens unit is unidirectionally moved from the object side to the image side along the optical axis. The fourth lens unit is moved along the optical axis from the object side to the image side within the range from the wide-angle end to the middle position between the wide-angle and telephoto ends, and is moved along the optical axis from the image side to the object side within the range from the middle position to the telephoto end.

8 Claims, 6 Drawing Sheets

FIG.2

FIG.3A
SPHERICAL ABERRATION
F=1.87

FIG.3B
ASTIGMATISM
Y=3.20

FIG.3C
DISTORTION
Y=3.20 f=6

0.500

0.500

5.000%

FIG.4A
SPHERICAL ABERRATION
F=1.95

FIG.4B
ASTIGMATISM
Y=3.20

FIG.4C
DISTORTION
Y=3.20 f=30

0.500

0.500

5.000%

FIG.5A
SPHERICAL ABERRATION
F=2.51 f=48

0.500

FIG.5B
ASTIGMATISM
Y=3.20

0.500

FIG.5C
DISTORTION
Y=3.20

5.000%

FIG.6A
SPHERICAL ABERRATION
F=1.95 f=6.5

0.500

FIG.6B
ASTIGMATISM
Y=3.20

0.500

FIG.6C
DISTORTION
Y=3.20

5.000%

FIG.7A
SPHERICAL ABERRATION
F=2.03 f=30

0.500

FIG.7B
ASTIGMATISM
Y=3.20

0.500

FIG.7C
DISTORTION
Y=3.20

5.000%

FIG.8A
SPHERICAL ABERRATION
F=2.77 f=52

0.500

FIG.8B
ASTIGMATISM
Y=3.20

0.500

FIG.8C
DISTORTION
Y=3.20

ZOOM LENS

BACKGROUND OF THE INVENTION

1. Field of the Invention

The present invention relates to a zoom lens, which is compact and lightweight, and is used in, e.g., a video camera.

2. Related Background Art

Conventionally, most of zoom lenses for video cameras are constituted by four lens units to have positive, negative, negative, and positive refractive powers, or positive, negative, positive, and positive refractive powers in order from the object side, and attain zooming by moving the second and third lens units or the second and fourth lens units.

In recent years, demand for a compact, lightweight, and high-performance zoom lens has become stronger. In general, as means for attaining further size and weight reductions of a zoom lens, a method of increasing the powers of the respective lens units is used. However, this method increases various aberrations, and deteriorates the performance of the lens.

SUMMARY OF THE INVENTION

The present invention has been made in consideration of the above situation, and has as its object to provide a compact, lightweight, and high-performance zoom lens.

A zoom lens according to the present invention comprises, in the following order from the object side, a first lens unit which is fixed in position during zooming and has a positive refractive power, a second lens unit which is movable upon zooming and has a negative refractive power, a third lens unit which is fixed in position during zooming and has a positive refractive power, a fourth lens unit which is movable upon zooming and has a negative refractive power, and a fifth lens unit which is fixed in position during zooming and has a positive refractive power. Upon zooming from the wide-angle end to the telephoto end, the second lens unit is unidirectionally moved from the object side toward the image side along the optical axis. In addition, the fourth lens unit is moved from the object side toward the image side along the optical axis within the range from the wide-angle end to a middle position between the wide-angle end and the telephoto end, and is moved from the image side toward the objects side along the optical axis within the range from the middle position to the telephoto end.

The present invention is based on a conventional four-unit zoom lens, which has positive, negative, negative, and positive refractive powers in the order from the object side, and moves two lens units having negative refractive powers upon zooming, and adopts an arrangement in which a fixed lens unit having a positive refractive power is added the above-mentioned four lens units and disposed between the two movable lens units. Therefore, the present invention provides a five-unit zoom lens which has positive, negative, positive, negative, and positive refractive powers in order from the object side, and has an alternate layout of lens units having positive and negative refractive powers in order from the object side. This arrangement is advantageous in satisfactorily correcting various aberrations. In addition, a divergent light beam emerging from the second lens unit is converted into a convergent light beam by the third lens unit having a positive refractive power, thus attaining a size reduction of the fourth and subsequent lens units.

The zoom lens according to the present invention preferably satisfies:

$$0.6 < (F_T)^{1/2} \cdot f_1/f_T < 1.0 \tag{1}$$

$$0.8 < |\beta_{2W} \cdot V^{1/2}| < 1.2 \tag{2}$$

where $f_T$ is the synthesized focal length of the entire system at the telephoto end, $F_T$ is the F-number at the telephoto end, $f_1$ is the focal length of the first lens unit, $\beta_{2W}$ is the magnification of the second lens unit at the wide-angle end, and V is the zoom ratio.

Of these two conditions, condition (1) defines an optimal power of a zooming portion of the zoom lens, i.e., the second lens unit so as to attain a size reduction of the zooming portion while maintaining high imaging performance. Condition (1) can define an optimal power range of the zooming portion with respect to a given zoom ratio and maximum aperture size ratio of the zoom lens.

When $(F_T)^{1/2} \cdot f_1/f_T$ exceeds the upper limit of condition (1), it becomes difficult to attain a size reduction of the zooming portion. On the other hand, when $(F_T)^{1/2} \cdot f_1/f_T$ is smaller than the lower limit of condition (1), various aberrations deteriorate considerably although such a value is effective for attaining a size reduction. In particular, since the power of the second lens unit becomes too strong, the Petzval sum deteriorates. In addition, since the apparent F-number of the first lens unit at the telephoto end becomes too small, it becomes difficult to correct the spherical aberration at the telephoto end. Furthermore, the tolerance in the manufacture becomes stricter, and the image quality considerably deteriorates due to decentering of respective lenses.

Figure 9:
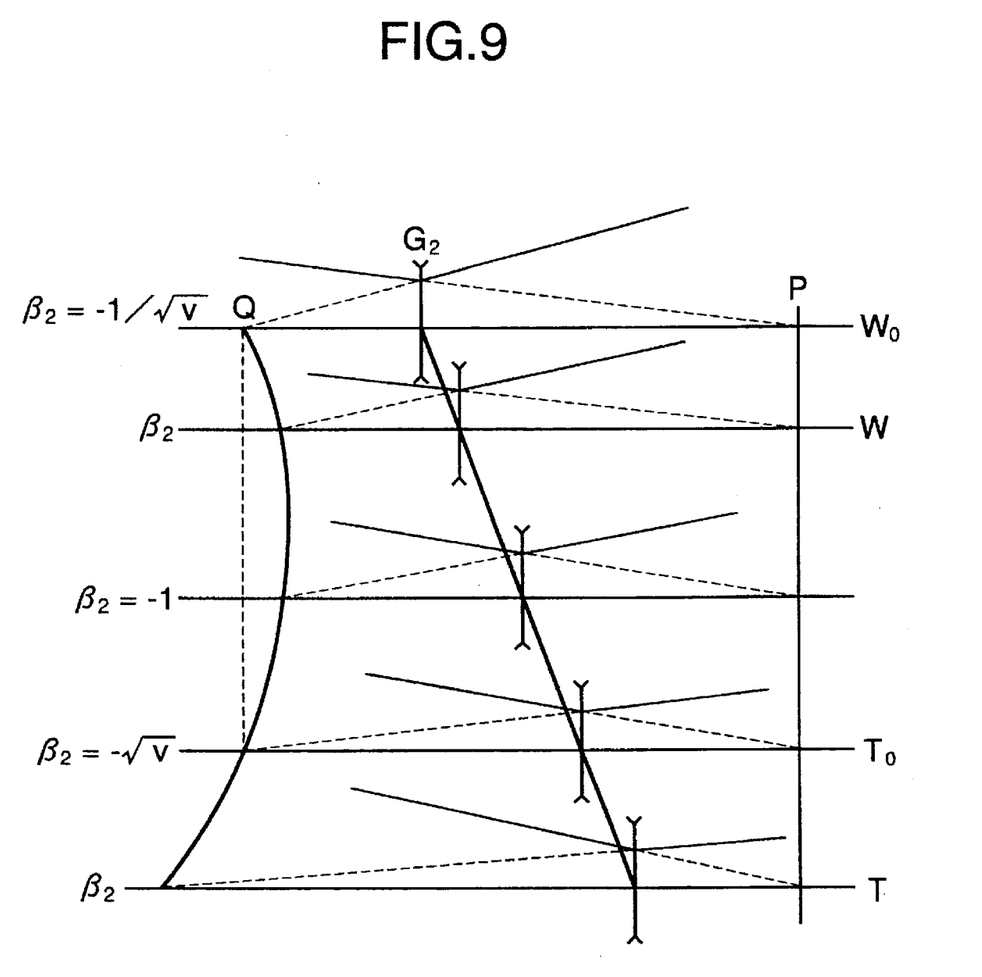
FIG. 9 is an explanatory view showing the function of the second lens unit in the zoom lens of the present invention.

Furthermore, the present invention attains size and weight reductions by imposing condition (2) for preventing the total length of the lens system and the lens diameter of a lens closest to the object side from increasing. In order to explain this, FIG. 9 shows the zooming state of the second lens unit. In FIG. 9, P indicates the image point position defined by the first lens unit, i.e., the object point position with respect to the second lens unit, and Q indicates the locus of the image point formed by the second lens unit.

When the magnification of the second lens unit is represented by $\beta_2$, the magnifications, at the wide-angle and telephoto ends, of the second lens unit are respectively represented by $\beta_{2W}$ and $\beta_{2T}$, and the ratio $\beta_{2T}/\beta_{2W}$ of these magnifications is represented by v, if a range $W_0$-$T_0$, in which $\beta_{2W}$ and $\beta_{2T}$ respectively become $-1/v^{1/2}$ and $-v^{1/2}$, is selected as a reference zooming range, the positions, at the wide-angle and telephoto ends, of the image point Q match each other, and hence, the positions, at the wide-angle and telephoto ends, of the fourth lens unit match each other. The ratio v of the magnifications of the second lens unit becomes equal to the zoom ratio V. If a space required for preventing mechanical interference between the respective lens units at the wide-angle end at which the first and second lens units become closest to each other is represented by $\Delta$, the magnification $\beta_{2W}$ of the second lens unit at the wide-angle end and its focal length $f_2$ satisfy the following condition:

$$f_2 = (f_1 - \Delta) \cdot \beta_{2W}/(1-\beta_{2W})$$

As can be seen from the above equation, if $\beta_{2W}$ is set to be larger than $-1/V^{1/2}$, $|f_2|$ increases, and the power of the second lens unit weakens. This amounts to selecting the zooming range of the second lens unit in the range below the reference zooming range $W_0$-$T_0$ in FIG. 9. On the other hand, if $\beta_{2W}$ is set to be smaller than $-1/V^{1/2}$, $|f_2|$ decreases, and the power of the second lens unit becomes stronger. This amounts to selecting the zooming range of the second lens unit in the range above the reference zooming range $W_0$-$T_0$ in FIG. 9.

According to one mode of the present invention, the zooming range of the second lens unit is limited to one defined by condition (2). When $|\beta_{2W} \cdot V^{1/2}|$ is smaller than the lower limit of condition (2), the power of the second lens unit becomes too strong, and the Petzval sum and various aberrations deteriorate considerably. On the other hand, when $|\beta_{2W} \cdot V^{1/2}|$ exceeds the upper limit of condition (2), a movement space required for zooming of the second lens unit becomes large, and the total length of the lens system and the diameter of the front lens element increase.

DETAILED DESCRIPTION OF THE PREFERRED EMBODIMENTS

Figure 1:
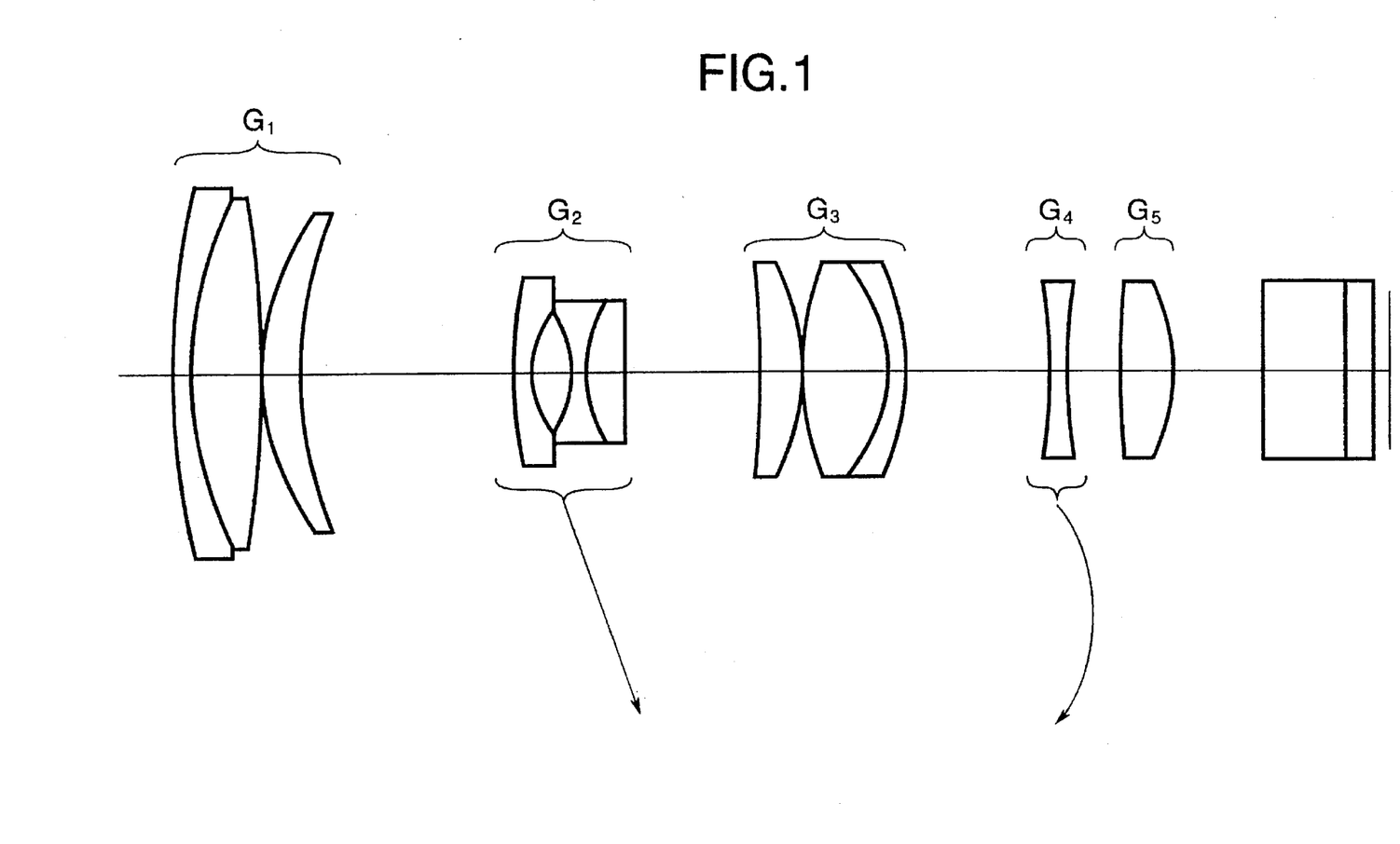
FIG. 1 is a view showing the lens arrangement according to a first embodiment of the present invention.
Figure 2:
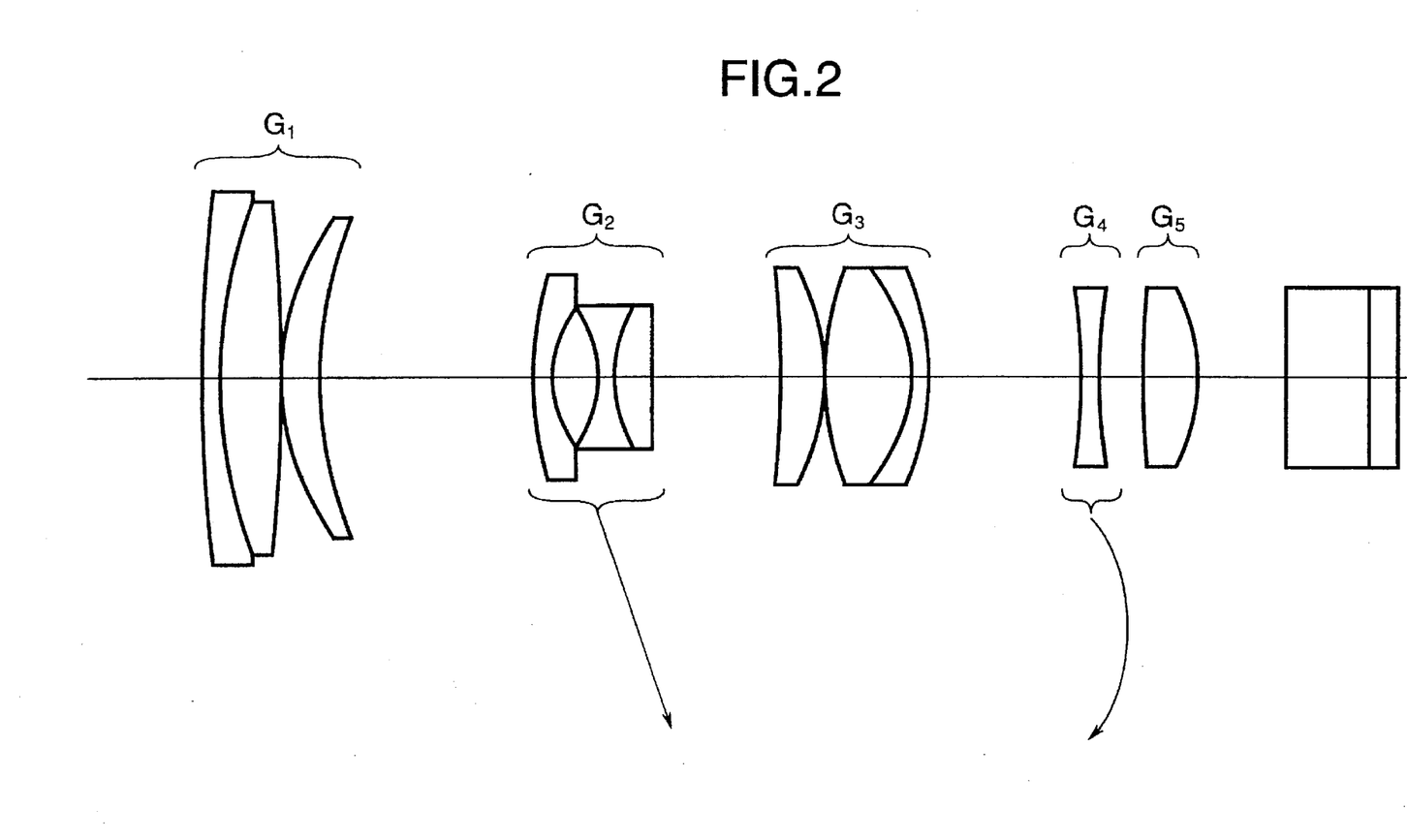
FIG. 2 is a view showing the lens arrangement according to a second embodiment of the present invention.
Figure 3A:
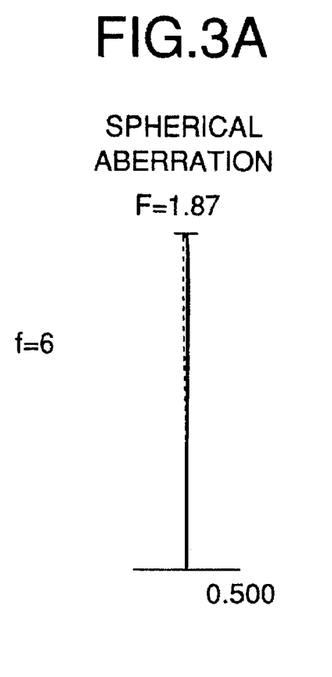
FIGS. 3A to 3C, 4A to 4C, and 5A to 5C are graphs showing various aberrations in respective focal length states in the first embodiment.
Figure 3B:
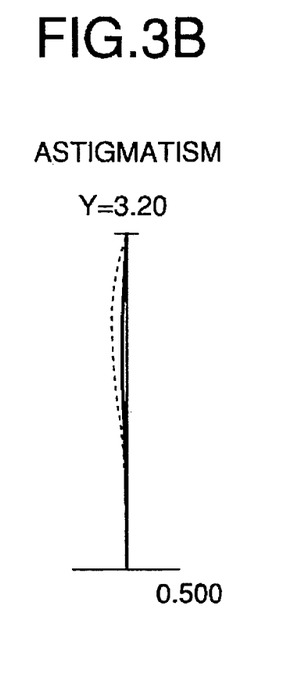
Figure 3C:
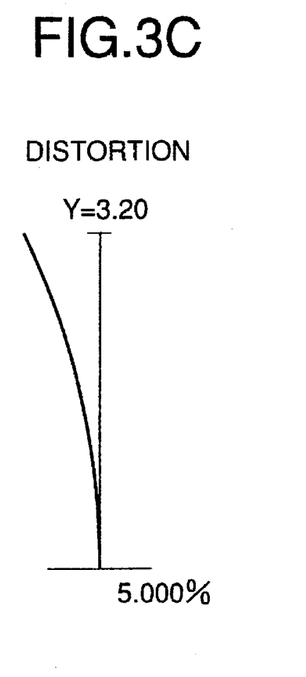
Figure 4A:
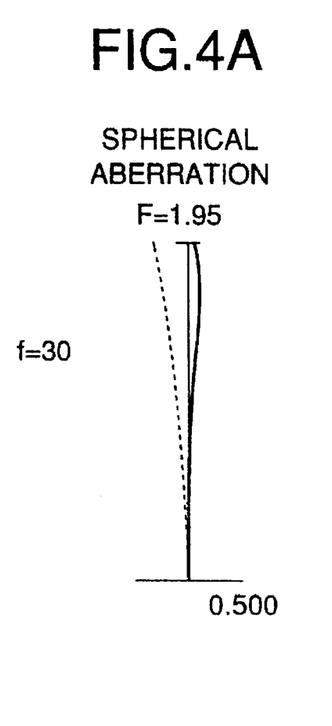
Figure 4B:
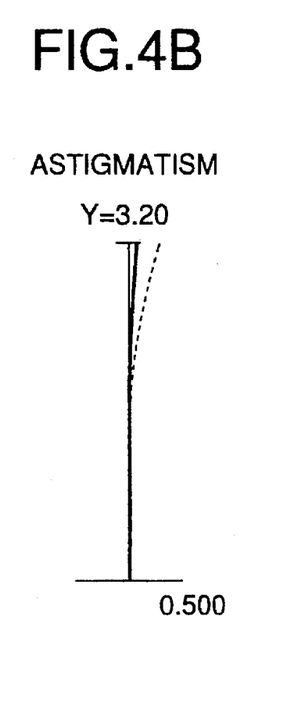
Figure 4C:
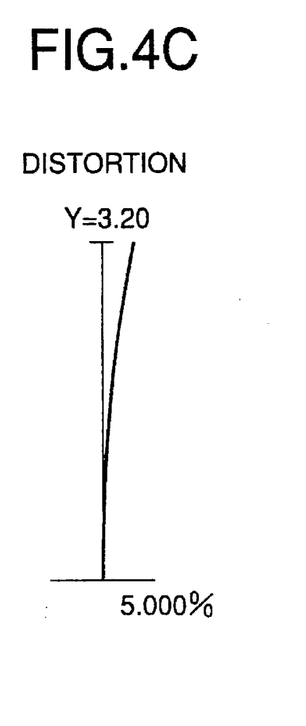
Figure 5A:
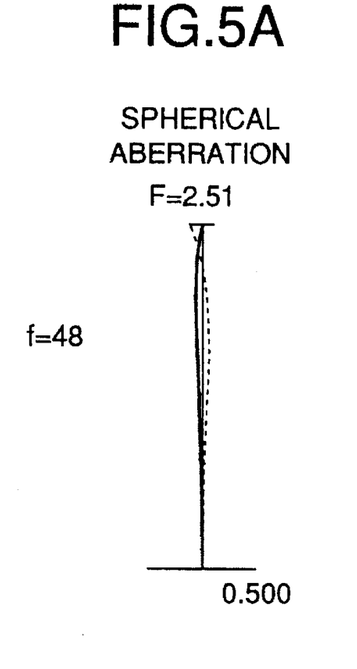
Figure 5B:
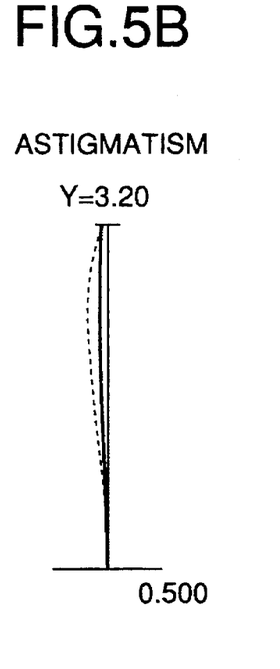
Figure 5C:
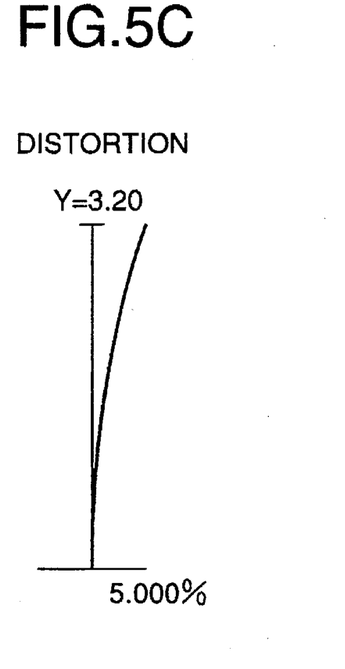
Figure 6A:
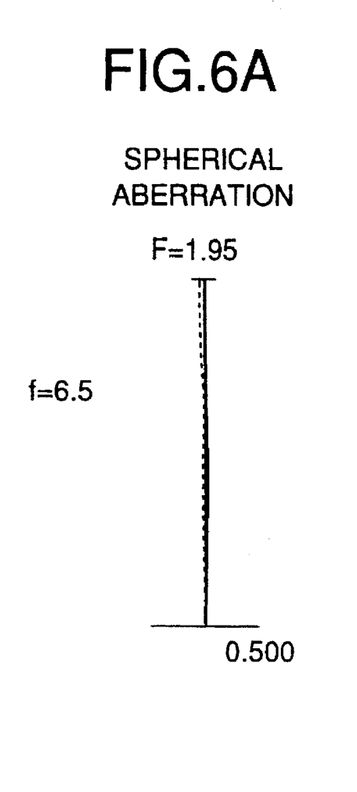
FIGS. 6A to 6C, 7A to 7C, and 8A to 8C are graphs showing various aberrations in respective focal length states in the second embodiment.
Figure 6B:
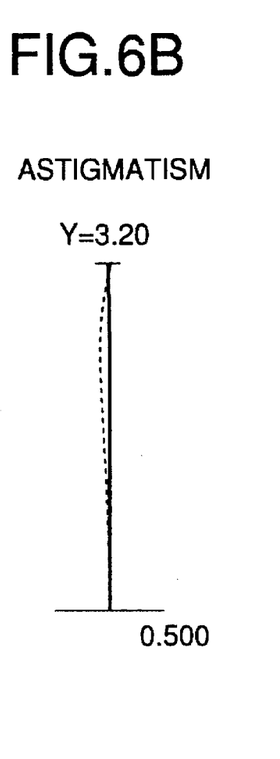
Figure 6C:
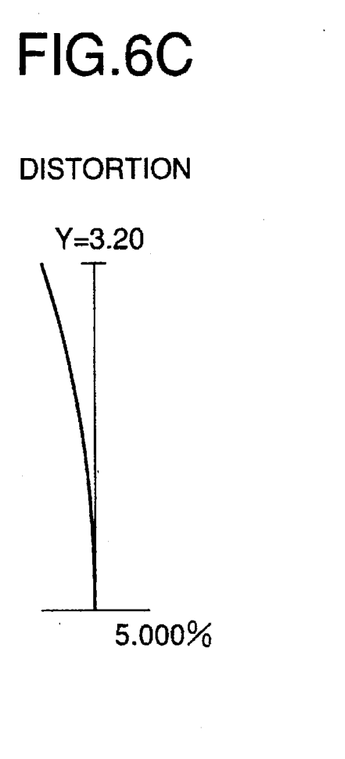
Figure 7A:
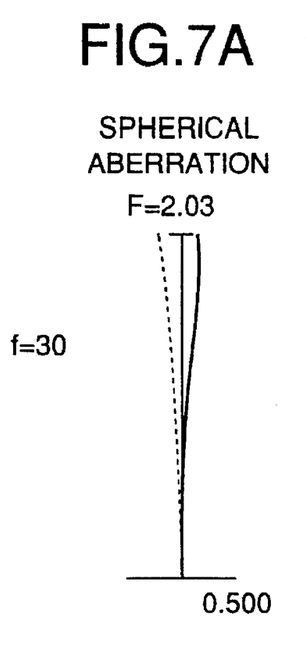
Figure 7B:
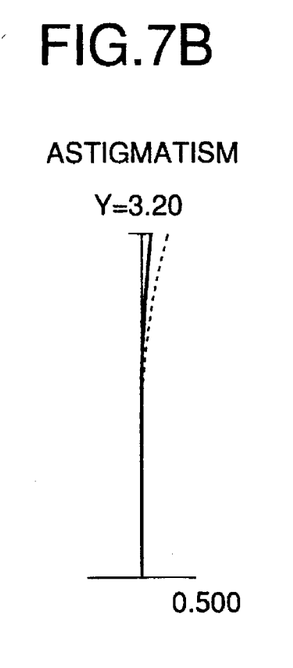
Figure 7C:
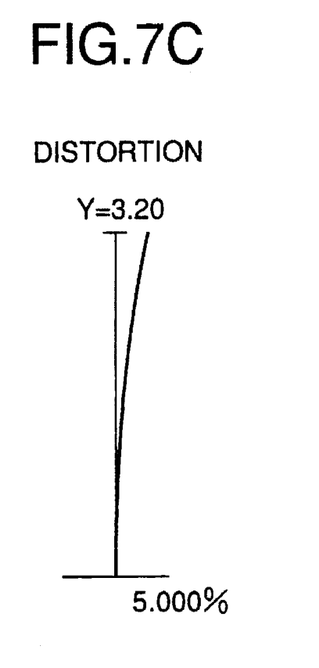
Figure 8A:
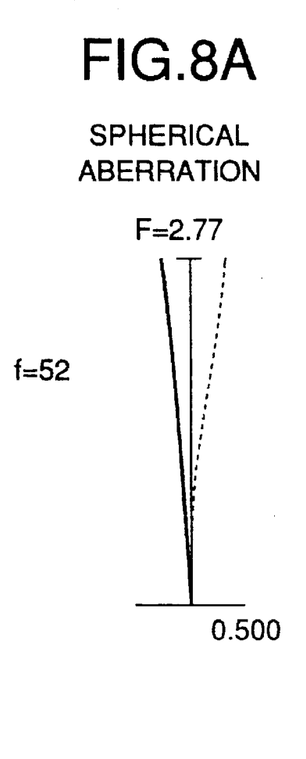
Figure 8B:
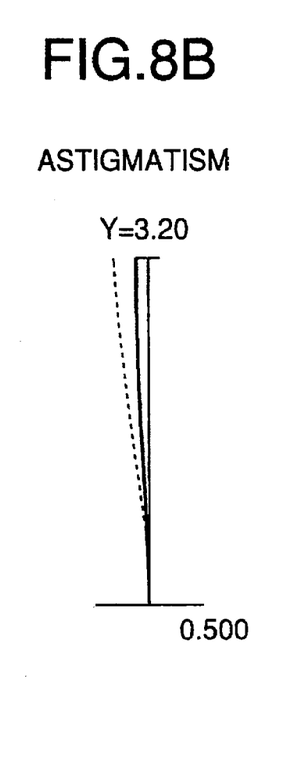
Figure 8C:
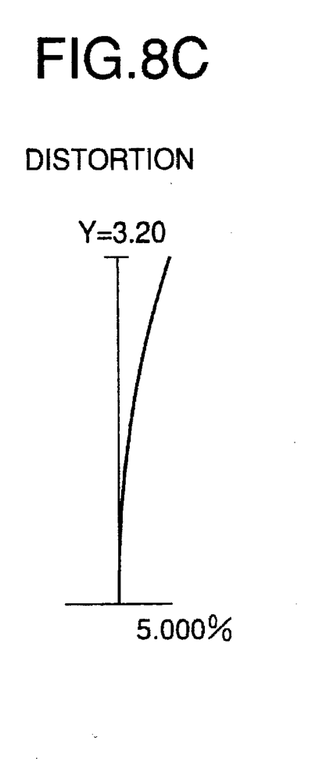

The preferred embodiments of a zoom lens according to the present invention will be described below with reference to the accompanying drawings. FIGS. 1 and 2 respectively show the lens arrangements of the first and second embodiments. In each of these embodiments, a zoom lens comprises, in the following order from the object side, a first lens unit $G_1$ which is fixed in position during zooming and has a positive refractive power, a second lens unit $G_2$ which is movable upon zooming and has a negative refractive power, a third lens unit $G_3$ which is fixed in position during zooming and has a positive refractive power, a fourth lens unit $G_4$ which is movable upon zooming and has a negative refractive power, and a fifth lens unit $G_5$ which is fixed in position during zooming and has a positive refractive power.

Upon zooming from the wide-angle end to the telephoto end, the second lens unit $G_2$ is unidirectionally moved from the object side toward the image side along the optical axis. At the same time, the fourth lens unit $G_4$ is moved. More specifically, the fourth lens unit $G_4$ is moved along the optical axis from the object side toward the image side within the range from the wide-angle end to the middle position between the wide-angle and telephoto ends, and is moved along the optical axis from the image side toward the object side within the range from the middle position to the telephoto end. More specifically, the fourth lens unit $G_4$ is moved to define a convex curve toward the image side upon zooming from the wide-angle end to the telephoto end. The arrows in FIGS. 1 and 2 show the loci of the movements of the respective lens units upon zooming from the wide-angle end to the telephoto end.

Tables 1 and 2 below respectively show data of the first and second embodiments. In [Lens Data] of each of Tables 1 and 2, the first column represents the number i of a lens surface in order from the object side, the second column represents the radius of curvature r of the lens surface, the third column represents the lens-surface interval d, the fourth column represents the value of the refractive index n for the e-line ($\lambda$=546.1 nm), the fifth column represents the value of the Abbe's number $\nu$ for the d-line ($\lambda$=587.6 nm), and the sixth column represents the lens unit number. Note that in each embodiment, parallel plates such as a color separation prism, various filters, and the like are inserted between the final lens surface and the image surface, and aberration correction is attained together with these components. Thus, Tables 1 and 2 below also show data of these components.

A surface with a mark * in the first column in [Lens Data] represents an aspherical surface, and the shape of the aspherical surface is expressed by the following formula:

$$x = \frac{y^2/r}{1 + \sqrt{1-(1+\kappa)(y/r)^2}} + Ay^4 + By^6 + Cy^8 + Dy^{10}$$

where the aspherical surface is expressed by a coordinate system which has the vertex of the plane of the aspherical surface as an origin, the x-axis as an optical axis, and the y-axis as a line passing the origin and perpendicular to the x-axis, and r: the radius of curvature in the paraxial region of the aspherical surface $\kappa$: a conical constant A, B, C, and D: aspherical surface coefficients.

In each of the two embodiments, $\kappa$=0, and the aspherical surface coefficients A to D of the two embodiments are summarized in [Aspherical Surface Data] in Tables 1 and 2. In [Aspherical Surface Data], the first column represents the number i of a lens surface from the object side. In [Zooming Data] in Tables 1 and 2, f is the focal length of the entire system, d5, d10, d16, and d18 are variable intervals upon zooming. Note that the middle position in [Zooming Data] does not always mean the reversal position of the moving direction of the fourth lens unit $G_4$.

Table 3 below shows the corresponding values of conditions (1) and (2) of the two embodiments.

TABLE 1

[Lens Data]

| i | r | d | n (E) | $\nu_d$ | |
|---|---|---|---|---|---|
| 1 | 45.94143 | 1.00000 | 1.855040 | 23.83 | $G_1$ |
| 2 | 22.01467 | 3.80000 | 1.642544 | 60.03 | $G_1$ |
| 3 | −69.97295 | 0.10000 | | | |
| 4 | 14.75249 | 2.10000 | 1.776511 | 49.45 | $G_1$ |
| 5 | 23.21524 | d5 (variable) | | | |
| 6 | 24.12819 | 0.90000 | 1.808320 | 46.50 | $G_2$ |
| 7 | 5.86273 | 2.20000 | | | |
| 8 | −7.23530 | 0.90000 | 1.751509 | 52.30 | $G_2$ |
| 9 | 8.64659 | 2.20000 | 1.855040 | 23.83 | $G_2$ |
| 10 | −43.46206 | d10 (variable) | | | |
| 11 | (aperture) | 2.00000 | | | |
| *12 | −120.73781 | 2.20000 | 1.571250 | 56.04 | $G_3$ |
| *13 | −16.62767 | 0.10000 | | | |
| 14 | 17.30747 | 4.80000 | 1.543440 | 47.20 | $G_3$ |
| 15 | −9.43606 | 1.00000 | 1.855040 | 23.83 | $G_3$ |
| 16 | −14.63620 | d16 (variable) | | | |
| 17 | −29.78563 | 1.00000 | 1.839300 | 37.34 | $G_4$ |
| 18 | 31.12567 | d18 (variable) | | | |
| *19 | 37.46728 | 3.00000 | 1.518720 | 64.20 | $G_5$ |
| *20 | −9.91911 | 5.00000 | | | |

TABLE 1-continued

| | | | | |
|---|---|---|---|---|
| 21 | ∞ | 4.52000 | 1.546220 | 70.70 |
| 22 | ∞ | 1.65000 | 1.518720 | 64.20 |
| 23 | ∞ | 0.80026 | | |

[Aspherical Surface Data]

| i | A | B | C | D |
|---|---|---|---|---|
| 12 | −4.45850E−05 | −5.52740E−07 | 7.88090E−09 | 1.00000E−20 |
| 13 | 2.36470E−05 | 2.08640E−07 | −7.46830E−09 | 1.00000E−20 |
| 19 | −1.52570E−04 | 8.06170E−07 | 1.34780E−07 | 1.00000E−20 |
| 20 | 1.20230E−04 | 2.42740E−06 | 1.00510E−07 | 1.00000E−20 |

[Zooming Data]

| | Wide-angle End | Middle Position | Telephoto End |
|---|---|---|---|
| f | 6.00000 | 30.00000 | 48.00000 |
| d5 | 0.61482 | 11.87290 | 14.06786 |
| d10 | 16.87790 | 5.61982 | 3.42486 |
| d16 | 4.86976 | 8.04957 | 4.09546 |
| d18 | 6.12785 | 2.94803 | 6.90214 |

TABLE 2

[Lens Data]

| i | r | d | n (E) | $v_d$ | |
|---|---|---|---|---|---|
| 1 | 81.91319 | 1.00000 | 1.855040 | 23.83 | $G_1$ |
| 2 | 28.00000 | 3.30000 | 1.800858 | 45.37 | $G_1$ |
| 3 | −105.66380 | 0.10000 | | | |
| 4 | 16.26863 | 2.20000 | 1.800858 | 45.37 | $G_1$ |
| 5 | 29.02864 | d5 (variable) | | | |
| 6 | 21.62268 | 0.90000 | 1.808320 | 46.50 | $G_2$ |
| 7 | 5.95909 | 2.60000 | | | |
| 8 | −7.76253 | 0.90000 | 1.751509 | 52.30 | $G_2$ |
| 9 | 8.64659 | 2.20000 | 1.855040 | 23.83 | $G_2$ |
| 10 | −74.36993 | d10 (variable) | | | |
| 11 | (aperture) | 2.00000 | | | |
| *12 | −111.52465 | 2.20000 | 1.571250 | 56.04 | $G_3$ |
| *13 | −16.57092 | 0.10000 | | | |
| 14 | 17.82037 | 4.80000 | 1.543440 | 47.20 | $G_3$ |
| 15 | −9.31563 | 1.00000 | 1.855040 | 23.83 | $G_3$ |
| 16 | −13.92172 | d16 (variable) | | | |
| 17 | −48.03107 | 1.00000 | 1.839300 | 37.34 | $G_4$ |
| 18 | 22.24873 | d18 (variable) | | | |
| *19 | 62.78600 | 3.00000 | 1.518720 | 64.20 | $G_5$ |
| *20 | −9.78884 | 5.00000 | | | |
| 21 | ∞ | 4.52000 | 1.546220 | 70.70 | |
| 22 | ∞ | 1.65000 | 1.518720 | 64.20 | |
| 23 | ∞ | 0.95265 | | | |

[Aspherical Surface Data]

| i | A | B | C | D |
|---|---|---|---|---|
| 12 | −5.27790E−05 | −7.80250E−07 | 7.90880E−09 | 1.00000E−20 |
| 13 | 3.16020E−05 | 3.35130E−07 | −7.14650E−09 | 1.00000E−20 |
| 19 | −1.44660E−04 | 7.76310E−07 | 1.71140E−07 | 1.00000E−20 |
| 20 | 1.22300E−04 | 3.00960E−06 | 1.18460E−07 | 1.00000E−20 |

[Zooming Data]

| | Wide-angle End | Middle Position | Telephoto End |
|---|---|---|---|
| f | 6.50000 | 30.00000 | 52.00000 |
| d5 | 0.80457 | 11.58624 | 14.18800 |
| d10 | 15.97931 | 5.19763 | 2.59588 |
| d16 | 5.15045 | 8.68515 | 4.06815 |
| d18 | 5.80356 | 2.26885 | 6.88586 |

TABLE 3

| | Embodiment Number | |
|---|---|---|
| | 1 | 2 |
| $F_T$ | 2.51 | 2.75 |
| $f_1$ | 25.49 | 25.49 |
| $f_T$ | 48.00 | 52.00 |
| $\beta_{2w}$ | −0.364 | −0.367 |
| V | 8.00 | 8.00 |
| (1) $(F_T)^{1/2} \cdot f_1/f_T$ | 0.84 | 0.81 |
| (2) $|\beta_{2w} \cdot V^{1/2}|$ | 1.03 | 1.04 |

FIGS. 3A to 3C, 4A to 4C, and 5A to 5C show the spherical aberration, astigmatism, and distortion when f=6, f=30, and f=48 in the first embodiment. FIGS. 6A to 6C, 7A to 7C, and 8A to 8C show these aberrations when f=6.5, f=30, and f=52 in the second embodiment. As for spherical aberration and astigmatism, the aberrations for the e-line are shown. In each graph showing spherical aberration, a dotted curve represents the sine condition. In each graph showing astigmatism, a broken curve represents a meridional image surface, and a solid curve represents a sagittal image surface. In each graph, F is the F-number, and Y is the image height.

As can be seen from these graphs, various aberrations are corrected satisfactorily in each embodiment. More specifically, each embodiment can realize a compact, lightweight, and high-performance zoom lens since it adopts the above-mentioned arrangement of the lens system, and satisfies conditional formulas (1) and (2).

What is claimed is:

1. A zoom lens consisting of in the following order from the object side:

a first lens unit which is fixed in position during zooming and has a positive refractive power;

a second lens unit which is movable upon zooming and has a negative refractive power;

a third lens unit which is fixed in position during zooming and has a positive refractive power;

a fourth lens unit which is movable upon zooming and has a negative refractive power; and a fifth lens unit which is fixed in position during zooming and has a positive refractive power, wherein, upon zooming from the wide-angle end to the telephoto end, said second lens unit is unidirectionally moved from the object side to the image side along an optical axis, and said fourth lens unit is moved along the optical axis from the object side to the image side within a range from the wide-angle end to a middle position between the wide-angle and telephoto ends, and is moved along the optical axis from the image side to the object side within a range from the middle position to the telephoto end.

2. A zoom lens comprising in the following order from the object side:

a first lens unit which is fixed in position during zooming and has a positive refractive power;

a second lens unit which is movable upon zooming and has a negative refractive power;

a third lens unit which is fixed in position during zooming and has a positive refractive power;

a fourth lens unit which is movable upon zooming and has a negative refractive power; and a fifth lens unit which is fixed in position during zooming and has a positive refractive power, wherein, upon zooming from the wide-angle end to the telephoto end, said second lens unit is unidirectionally moved from the object side to the image side along an optical axis, and said fourth lens unit is moved along the optical axis from the object side to the image side within a range from the wide-angle end to a middle position between the wide-angle and telephoto ends, and is moved along the optical axis from the image side to the object side within a range from the middle position to the telephoto end, wherein said zoom lens satisfies:

$$0.6 < (F_T)^{1/2} \cdot f_1/f_T < 1.0 \quad (1)$$

$$0.8 < |\beta_{2W} \cdot V^{1/2}| < 1.2 \quad (2)$$

where $f_T$: the synthesized focal length of the entire system at the telephoto end;

$F_T$: the F-number at the telephoto end;

$f_1$: the focal length of said first lens unit;

$\beta_{2W}$: the magnification of said second lens unit at the wide-angle end; and V: the zoom ratio.

3. A zoom lens according to claim 2, wherein said fifth lens unit includes at least one aspherical surface.

4. A zoom lens comprising in the following order from the object side:

a first lens unit which is fixed in position during zooming and has a positive refractive power;

a second lens unit which is movable upon zooming and has a negative refractive power;

a third lens unit which is fixed in position during zooming and has a positive refractive power;

a fourth lens unit which is movable upon zooming and has a negative refractive power; and a fifth lens unit consisting of one lens which is fixed in position during zooming and has a positive refractive power, an uninterrupted air gap extending from said fourth lens unit to said fifth lens unit, wherein, upon zooming from the wide-angle end to the telephoto end, said second lens unit is unidirectionally moved from the object side to the image side along an optical axis, and said fourth lens unit is moved along the optical axis from the object side to the image side within a range from the wide-angle end to a middle position between the wide-angle and telephoto ends, and is moved along the optical axis from the image side to the object side within a range from the middle position to the telephoto end.

5. A zoom lens according to claim 4, wherein said zoom lens satisfies:

$$0.6 < (F_T)^{1/2} \cdot f_1/f_T < 1.0,$$

and $$0.8 < |\beta_{2W} \cdot V^{1/2}| < 1.2,$$

where $f_T$: the synthesized focal length of the entire system at the telephoto end;

$F_T$: the F-number at the telephoto end;

$f_1$: the focal length of said first lens unit;

$\beta_{2W}$: the magnification of said second lens unit at the wide-angle end; and V: the zoom ratio.

6. A zoom lens according to claim 5, wherein said fifth lens unit includes at least one aspherical surface.

7. A zoom lens according to claim 6, wherein said third lens unit includes at least one aspherical surface.

8. A zoom lens according to claim 4, wherein said fifth lens unit includes at least one aspherical surface.

* * * * *